United States Patent
Machlica et al.

(10) Patent No.: US 10,193,913 B2
(45) Date of Patent: Jan. 29, 2019

(54) JOINT ANOMALY DETECTION ACROSS IOT DEVICES

(71) Applicant: CISCO Technology, Inc., San Jose, CA (US)

(72) Inventors: Lukas Machlica, San Jose, CA (US); Michal Sofka, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 15/228,980

(22) Filed: Aug. 4, 2016

(65) Prior Publication Data

US 2018/0041528 A1   Feb. 8, 2018

(51) Int. Cl.
| H04L 29/06 | (2006.01) |
| H04L 12/66 | (2006.01) |
| H04L 12/24 | (2006.01) |
| H04L 29/08 | (2006.01) |
| G06N 99/00 | (2010.01) |
| G06F 17/16 | (2006.01) |

(52) U.S. Cl.
CPC .......... *H04L 63/1425* (2013.01); *G06F 17/16* (2013.01); *G06N 99/005* (2013.01); *H04L 12/66* (2013.01); *H04L 41/12* (2013.01); *H04L 67/12* (2013.01)

(58) Field of Classification Search
CPC ..... H04L 63/1425; H04L 41/12; H04L 12/66; H04L 67/12; G06F 17/16; G06N 99/005
See application file for complete search history.

(56) References Cited

U.S. PATENT DOCUMENTS

| 9,516,053 | B1* | 12/2016 | Muddu | H04L 63/1425 |
| 9,727,821 | B2* | 8/2017 | Lin | G06N 7/005 |
| 9,843,594 | B1* | 12/2017 | Evans | H04L 63/1408 |
| 2015/0186497 | A1* | 7/2015 | Patton | H04W 4/21 707/740 |
| 2015/0195296 | A1* | 7/2015 | Vasseur | G06N 99/005 726/23 |
| 2016/0020969 | A1* | 1/2016 | Vasseur | H04L 43/062 370/252 |
| 2016/0269427 | A1* | 9/2016 | Haugsnes | H04L 67/1097 |
| 2016/0380892 | A1* | 12/2016 | Mahadevan | H04L 45/02 370/389 |
| 2017/0041388 | A1* | 2/2017 | Tal | G06F 17/2705 |
| 2018/0007578 | A1* | 1/2018 | Drabeck | H04W 4/70 |

* cited by examiner

*Primary Examiner* — Matthew Smithers
(74) *Attorney, Agent, or Firm* — Patterson + Sheridan, LLP

(57) ABSTRACT

Systems and methods of the present disclosure provide technology to identify when network-connected devices are likely infected with malware. Network communications are be monitored during a specific time window and a graph is created for a conditional random field (CRF) model. Vertices of the graph represent devices connected to the network and an edge between two vertices indicates that one or more network communications occurred between two devices represented by the two vertices during the time window. Network devices can report observations about network behavior during the time window and the observations can be used as input for the CRF model. The CRF model can then be used to determine infection-status values for the network devices.

21 Claims, 9 Drawing Sheets

JOINT ANOMALY DETECTION ACROSS IOT DEVICES

TECHNICAL FIELD

Embodiments presented in this disclosure generally relate to systems and methods for detecting anomalous network traffic behavior.

BACKGROUND

Many modern machines and devices are equipped to connect to networks. While traditional computers such as desktops and laptops have been designed to connect to wired and wireless networks for many years, many other types of modern devices and machines are now being designed to connect to networks. For example, many consumer devices like televisions (TVs), gaming consoles, and security systems are designed to send and receive data via networks, such as local area networks or the Internet. These "smart" devices provide greater functionality and convenience for people who wish to control, monitor, or otherwise access their devices remotely (e.g., using a smart phone). In addition, industrial devices such as remote sensors for wireless sensor networks are also being designed to connect to networks so that sensor readings can be rapidly transferred to data repositories. For both businesses and consumers, it is both convenient and useful to have devices that can connect to networks such as the Internet.

The Internet of Things (IoT) generally refers to the devices and machines embedded with electronics and software enabling these devices and machines to exchange data over a network (e.g., the Internet). The number of IoT devices connected to networks worldwide is poised to grow rapidly. While IoT devices offer promising conveniences, they also provide a large number of potential hosts that could be infected by malicious software through network connections. Malicious software (also called malware), such as viruses, worms, Trojans, malicious bots, spyware, ransomware, and adware, can infect various types of electronic devices and can cause a great deal of damage to valuable computer systems and devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
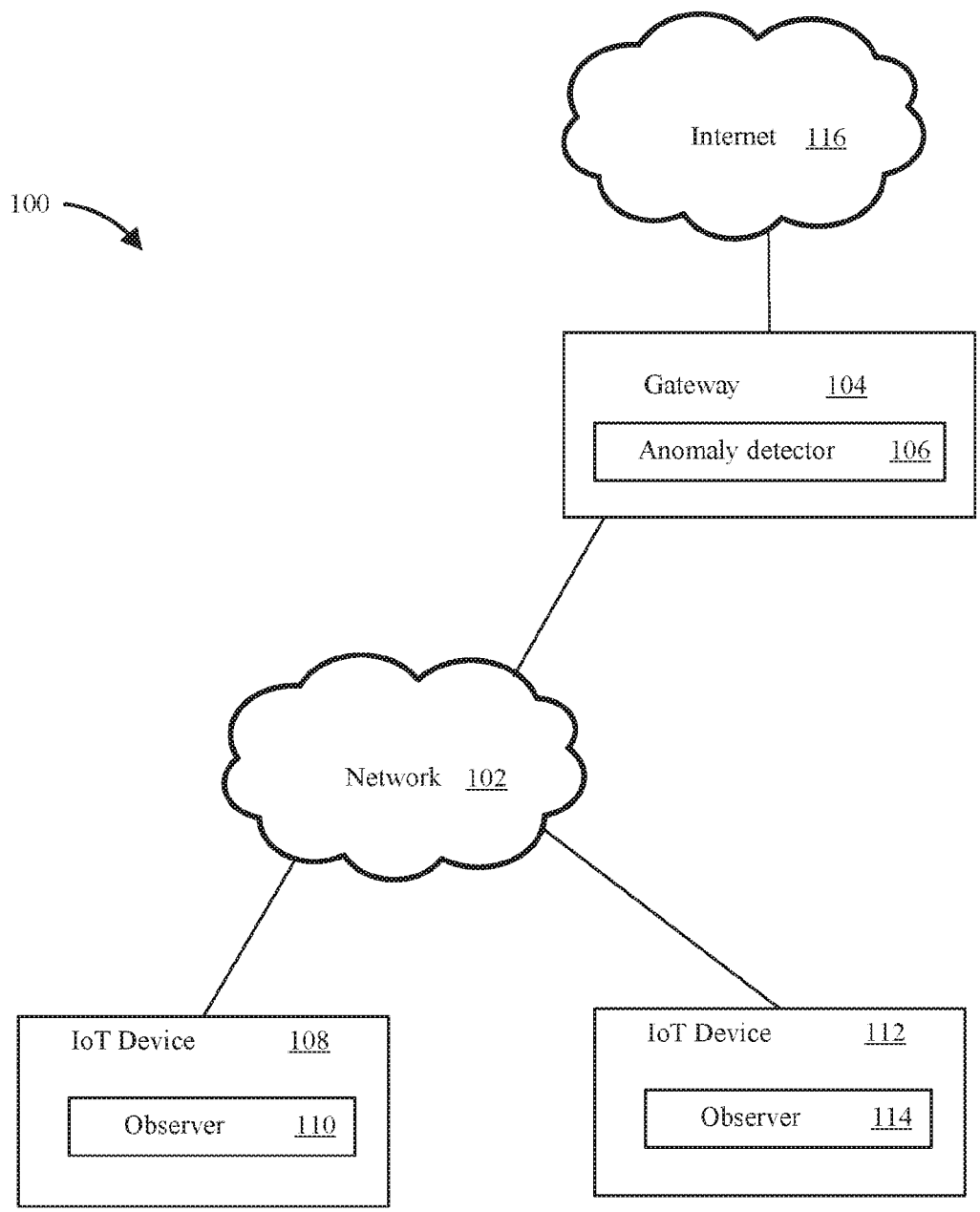
FIG. 1 illustrates a computing environment that may be used to apply techniques of the present disclosure, according to one embodiment.

Systems and methods of the present disclosure address detecting network traffic anomalies at a gateway device by monitoring network communications that occur in between devices during a time window, creating a graph in which vertices represent devices in the network and an edges between two vertices indicates that the devices represented by the two vertices communicated with each other during the time window, and using the graph and observations made at the devices to determine measures of risk (e.g., infection-status values) for the devices. Specifically, the graph can be used in a conditional random field (CRF) model that determines the infection-status values for the devices collectively in a manner that allows context from all devices represented in the graph to be taken into account.

Example Embodiments

Embodiments presented herein provide systems and methods for detecting when devices in a network have been infected with malware based on network traffic patterns. In general, embodiments presented herein may be applied or implemented at network gateways. Embodiments presented herein further may incorporate individualized classifiers for respective devices connected to a network. An anomaly detector for the network may use outputs (e.g., anomaly-suspicion values) from the specially tailored individual classifiers and observations from the network-connected devices as input. The anomaly detector for the network may generate an undirected graph and determine infection-status values for the network-connected devices using a conditional random field (CRF) model applied to the graph. Vertices in the graph may represent nodes in the network, while an edge between two vertices in the graph may signify that at least one network communication was exchanged between those two vertices during a specified time window to which the graph applies.

Many types of malware can spread from one device to another via communications over a network. Once infected with malware, a device may engage in various types of network activities as a result of the malware infection. For example, an infected device may take part in a distributed denial-of-service (DoS) attack by sending one or more communications to a host for the purpose of overwhelming the host at a coordinated time when other infected devices also send communications to the host. In another example, a device infected with a worm may send communications over a local area network (LAN) for the purpose of spreading the worm to other devices that are connected to the LAN.

In some cases, the patterns of communication engaged in by a device infected by malware may noticeably change. For example, after a device is infected, the rate at which messages are sent, the types of messages that are sent, and the destinations to which messages are sent may change noticeably. Software for detecting anomalies in network-communication patterns can sometimes infer that a device is infected.

However, it is difficult to define globally what types of network-communication behavior should be regarded as anomalous because many devices may have different configurations and may use a network for different purposes. Diverse types of IoT devices, for example, may exhibit diverse types of network behavior. Furthermore, two devices of the same type may have configuration differences that cause them to exhibit different network communication patterns. In addition, even for a single device, different network-communication behavior patterns may be normal in one context, but anomalous in another context. A single device's network-communication patterns may also gradually change over time even in the absence of a malware infection.

Anomaly detectors that use global definitions of normal and anomalous network behavior are therefore very susceptible to giving false alarms (false positives) for devices whose network behavior aligns poorly with a global definition of what is normal. In order to avoid such false alarms, many anomaly detectors are configured to yield a very low number of false positives. This approach ultimately tends to favor precision and specificity at the expense of recall and sensitivity.

A one-size-fits-all approach that globally defines normal and anomalous network behavior tends to struggle with recall and sensitivity. In order to avoid this drawback, specialized anomaly detectors can be locally installed and trained on a device to learn a network-behavior model that is specifically tailored to that device. However, for some IoT devices, it may be impractical, to store, execute, or update a specialized anomaly detector locally due to limited memory, storage, processing, and power resources. Furthermore, a locally stored anomaly detector may lack the ability to take certain types of context information into account. For example, if a device with a local anomaly detector is connected to a LAN, the behavior of other devices connected to the LAN may constitute valuable context information—particularly if other devices on the LAN are infected with malware. A locally stored anomaly detector may be limited because it is unable to consider such context information.

Embodiments presented herein provide systems and methods for detecting anomalous network traffic with increased accuracy. In general, embodiments presented herein may be applied or implemented at network gateways. Embodiments presented herein further may incorporate specially tailored individual classifiers for respective devices connected to a network. An anomaly detector for the network may use outputs (e.g., anomaly-suspicion values) from the specially tailored individual classifiers and observations from the network-connected devices as input. The anomaly detector for the network may determine infection-status values for devices that are connected to the network based on a conditional random field (CRF) model and based on a graph. Vertices in the graph may represent nodes in the network, while an edge between two vertices in the graph may signify that at least one network communication was exchanged between those two vertices during a specified time window to which the graph applies. Technologies of the present disclosure may be particularly useful for networks that include IoT devices, since the specially tailored individual anomaly detectors for IoT devices may be stored and executed at the gateway (rather than on the devices themselves) alongside the anomaly detector for the network.

FIG. 1 illustrates a computing environment 100 that may be used to apply techniques of the present disclosure, according to one embodiment. An IoT device 108, an IoT device 112, and a gateway 104 communicate via a network 102. The gateway can include an anomaly detector 106. The gateway 104 is also connected to the Internet 116. The IoT device 108 and the IoT device 112 can include observer 110 and observer 114, respectively, as shown. The observer 110 can make observations about the network behavior of the IoT device 108 over a period of time and send those observations to the anomaly detector 106. Similarly, the observer 114 can make observations about the network behavior of the IoT device 112 over the same period of time and send those observations to the anomaly detector 106. The observers 110, 114 may be, for example, software units that are configured to measure predefined aspects of network behavior and report to the anomaly detector 106.

The anomaly detector 106 uses the observations received from the observer 110 and the observer 114 to predict whether the IoT device 108 and the IoT device 112 are infected with malware. Based on the observations, the anomaly detector 106 may predict that it is highly likely that the IoT device 108 is infected with malware. In addition, if the observations indicate that the IoT device 108 sent a network communication to the IoT device 112 during the time period, the anomaly detector 104 may conclude that it is also highly likely that the IoT device 112 is also infected.

Figure 2:
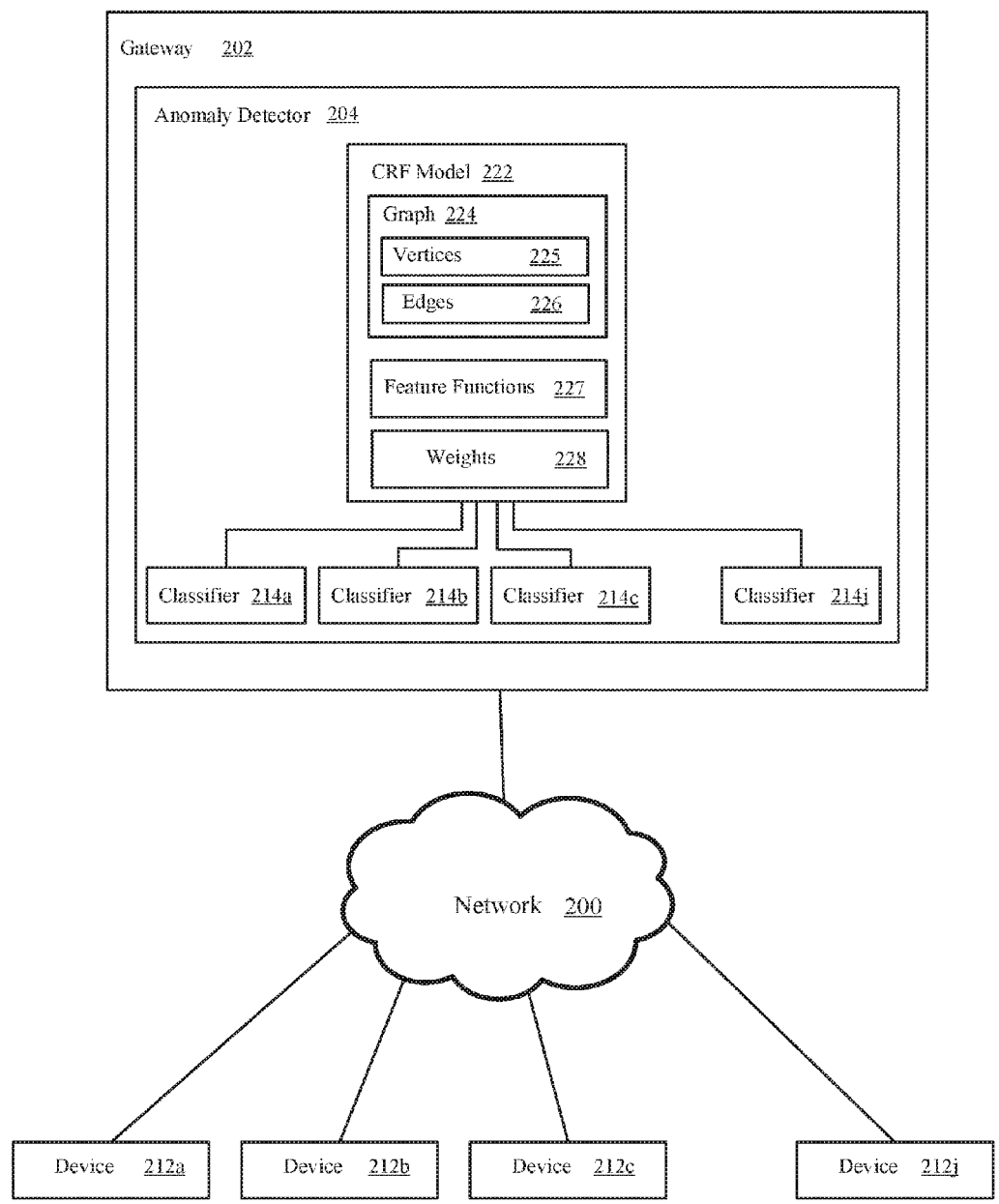
FIG. 2 is a block diagram illustrating a detailed view of an anomaly detector within a gateway, according to one embodiment.

FIG. 2 is a block diagram illustrating a more detailed view of an anomaly detector 204 within a gateway 202, according to one embodiment. The anomaly detector 204 comprises a conditional random field (CRF) model 224 that includes a graph 224, feature functions 227, and weights 228. The anomaly detector 204 may further comprise classifiers 214a-j. The classifiers 214a-j correspond to the devices 212a-j in the sense that classifier 214a is configured to predict an anomaly-suspicion value for device 212a, classifier 214b is configured to predict an anomaly-suspicion value for device 212b, classifier 214c is configured to predict an anomaly-suspicion value for device 212c, and so forth for other classifiers up to and including classifier 214j, which is configured to predict an anomaly-suspicion value for device 212j.

The term "anomaly-suspicion value" generally refers to a value that indicates a level of how anomalous a device's network communication patterns during a specific period of time are judged to be by a classifier. Anomaly-suspicion values may be quantitative (e.g., continuous or discrete) or categorical and may have varying levels of granularity. In one relatively simple example, anomaly-suspicion values may be binary (e.g., 0 for non-suspicious and 1 for highly suspicious). In another example, anomaly-suspicion values may be real-valued numbers defined along a continuous range from 0 to 1 (e.g., wherein higher values indicate higher suspiciousness).

The classifiers 214a-j may be trained machine-learning models that use observations received from the devices 212a-j, respectively, as input features or attributes. The classifier 214a, for example, may use observations made by the device 212a during a time period as input and, in turn, output an anomaly-suspicion value for device 212a for the time period. The observations made at the device 212a can, in some examples, be compiled into an observation vector that is provided to the classifier 214a. In the context of this disclosure, the term "vector" refers to an array or another data structure that contains multiple values. Such an observation vector is one example of a collection of performance metrics (e.g., observations) that describe a device's network behavior.

In some examples, each of the classifiers 214a-j can be trained and refined using training data so that each classifier is customized for the respective device to which it corresponds. Training data for a classifier may include, for example, training instances. A training instance for a classifier may comprise an observation vector for the classifier's respective device. In addition, a training instance for the classifier may optionally comprise an infection-status label indicating whether the respective device was infected with malware at the time when the observation vector was observed. The infection-status label can serve as the target value for the anomaly-suspicion value. Depending on the type of machine-learning model used, labeled and/or unlabeled training instances may be used for training.

Different types of inductive and transductive machine-learning models that may be used as the classifiers 214a-j. Some examples of machine-learning models include adsorption models, neural networks, support vector machines, radial basis functions, Bayesian belief networks, association-rule models, decision trees, k-nearest-neighbor models, regression models, Hopfield networks, deep belief networks, and Q-learning models. Furthermore, pluralities of individual machine learning models can be combined to form ensemble machine-learning models. Ensemble machine-learning models may be homogenous (i.e., using multiple member models of the same type) or non-homogenous (i.e., using multiple member models of different types).

In general, the term "observation" may refer to, for example, a value that quantifies or categorizes some aspect of network behavior. Many different types of observations can be made at the devices 212a-j, respectively. Some observations may pertain to issues of protocol. For example, one observation could be whether any packets sent from the device in a time frame were shorter than a threshold packet length or how many of these short packets were sent. Another observation could be whether any packets sent from the device included ambiguous options in a packet option field or how many of these packets were sent. Another observation could be whether any packets sent from the device violated certain application-layer protocols or how many of these packets were sent.

Some observations may relate to rates at which a device communicates. For example, the total number of network communications (or network communications of a certain type) can be divided by a time window in which the network communications were sent in order to determine an average rate over the time window. In addition, the time window can be divided into sub-windows and a rate can be calculated for each sub-window. The rates of the sub-windows can then be compared. Statistics about the sub-window rates, such as variance, standard deviation, range, mean, median, mode, or the presence of outliers can be recorded and serve as observations.

Other observations may relate to relational issues of the observed network activity. For example, one observation could be the total number of different destinations to which the device sent communications during a time window. Another observation could be whether any of the destinations are Internet Protocol (IP) addresses that are known to be malicious (e.g., that are included in a list of malicious IP addresses). Another observation could be a list of ports that were used for network communication during the time window or how much traffic was associated with each port.

The graph 224 may be an undirected graph which includes vertices 225 and edges 226. Each vertex in the graph 224 may represent a device (e.g., one of the devices 212a-j) connected to the network 200. Each edge in the graph 224 may connect two vertices and indicate that communication messages were sent between the two devices represented by the two vertices during a time period to which the graph 224 applies.

Each of the feature functions 227 may be associated with one of the weights 228. Furthermore, each of the feature functions 227 may use an infection-status label for an nth device, an infection-status label for an n−1$^{th}$ device, and some or all of the observations received from the devices 212a-j as input parameters. The symbol n can represent an index used to indicate a specific device in the devices 212a-j. The n−1$^{th}$ device can be a device whose corresponding vertex in the graph 225 precedes a vertex corresponding to the nth device in an order in which the graph 225 is traversed. In addition, each of the feature functions 227 may use the anomaly-suspicion value that was generated by an nth classifier for the nth device as input. Mathematical products of the feature functions 227 and their associated respective weights 228 may be summed as part of an expression that represents a conditional probability of infection-status labels for the devices 212a-j given the observations received from the devices 212a-j. In Markovian terms, an infection-status label for a given device is a hidden variable indicating whether the device is infected with malware infection. The weights 228 may be determined or refined using a training process.

In one example, a conditional probability of infection-status labels given observations can be formally represented as $p(z_{1:N}|x_{1:N})$. The upper-case letter N can represent the number of vertices 225 in the graph 224 and is therefore a non-negative integer. The lower-case letter z with a subscript can represent an infection-status label for a device corresponding to a vertex indicated by the subscript. Hence, the term $z_{1:N}$ represents the set of infection-status labels for the N devices that are represented by the N vertices. Similarly, the lower-case letter x with a subscript can represent a vector of observations for the device corresponding to the vertex indicated by the subscript. The term $x_{1:N}$ represents the set of observation vectors for the N devices that are represented by the N vertices.

In addition, the upper-case letter F can represent the number of feature functions 227 in the CRF model 222 and is therefore be a non-negative integer. The lower-case letter f with a subscript can represent a feature function indexed by the subscript. The lower-case letter w with a subscript can represent a weight that is associated with a feature function indexed by the subscript. Given these definitions, the conditional probability of infection-status labels $z_{1:N}$ given observation vectors $x_{1:N}$ can be defined by equation 1 below:

$$F(z_{1:N} | x_{1:N}) = (1/Z)\exp\left(\sum_{n=1}^{N}\sum_{i=1}^{F} w_i f_i(z_{n-1}, z_n, x_{1:N}, n)\right) \quad (1)$$

where the lower-case letter n is an integer index ranging from 1 to N and is an index corresponding to a vertex in the graph 224, the lower-case letter i is an integer index ranging from 1 to F and is an index corresponding to a feature function of the feature functions 227, the capital letter Z is a normalization factor used to ensure that the conditional probability ranges from 0 to 1, is an $n^{th}$ infection-status label associated with an $n^{th}$ vertex in the graph 224, $z_{n-1}$ is an $(n-1)^{th}$ infection-status label associated with an $(n-1)^{th}$ vertex that is connected to the $n^{th}$ vertex by an edge (of the edges 226) in the graph 224, and exp is the exponential function (i.e., the exponential function is evaluated by raising Euler's number e, also known as the base of the natural logarithm or the sum of the infinite series $$\sum_{k=0}^{\infty} 1/k!,$$

to the power of the braced expression).

In order to train the weights 228, training instances for the CRF Model 222 can be used in conjunction with the conditional probability defined by equation 1. A training instance for the CRF model can comprise a set of N known (or assumed) infection-status labels and a set of N known (or assumed) respective observation vectors for the N devices represented by the N vertices of the graph 224. Each training instance for the CRF model 222 can be associated with a specific time or time window. The capital letter T can be a positive integer representing the total number of training instances available for the CRF Model 222. An objective function for training the weights can be defined as:

$$\sum_{t=1}^{T} \log[p(z_{1:N}^{(t)} \mid x_{1:N}^{(t)})],$$

where the lower-case letter t is a positive integer index ranging from 1 to T, $z^{(t)}_{1:N}$ is the set of infection-status labels included in the $t^{th}$ training instance, $x^{(t)}_{1:N}$ is the set of observation vectors included in the $t^{th}$ training instance, and log is the logarithmic function (e.g., with base 10, base 2, base e, or some other base). A maximum (local and/or global) for this objective function can be identified using a gradient-based optimization technique such as the Limited-Memory Broyden-Fletcher-Goldfarb-Shanno (L-BFGS or LM-BFGS) method. This maximum represents a point at which the weights 228 have values such that the conditional likelihood of the training data (i.e., the training instances, collectively) is substantially maximized (globally and/or locally).

Training instances are generally used to train or determine the weights 228. As a practical matter, the set of infection-status labels for a given set of observation vectors for the devices 212a-j is often not known. However, once the weights 228 have been determined through training (or through some other means), the conditional probability defined by equation 1 can also be used to help determine a set of infection-status values for a set of observation vectors. As used herein, the term infection-status value refers to an infection-status label that is not actually known (or assumed to be known), but rather is estimated using the CRF Model 222 as described herein. An asterisk can be used to denote infection-status values such that the term z* with a subscript represents an infection-status value estimated for a device corresponding to a vertex indicated by the subscript. Hence, the term $z^*_{1:N}$ represents the set of infection-status values estimated for the N devices that are represented by the N vertices. The infection status values can be determined or estimated using equation 2:

$$z^*_{1:N} = \mathrm{argmax}_{z(1:N)} p(z_{1:N}|x_{1:N}) \qquad (2),$$

where $\mathrm{argmax}_{z(1:N)}$ denotes the arguments-of-the-maxima function and $x_{1:N}$ represents the set of observation vectors for the N devices that are represented by the N vertices for a given time window. In other words, $z^*_{1:N}$ is the set of infection-status values that substantially maximizes (locally or globally) the conditional probability $p(z_{1:N}|x_{1:N})$.

In some examples (e.g., examples where the feature functions 227 use anomaly-suspicion values provided by the classifiers 214a-j as input), an infection-status value for a device can be used to train the classifier associated with the device. For example, suppose the classifier 214a produces an anomaly-suspicion value of 0.4 for the device 212a based on the observation vector observed at the device 212a for a given time window. Also suppose that the CRF Model 222, based collectively on the observation vectors for devices 212a-j, determines that the infection-status value for the device 212a for the same time window is 0.9. Also suppose that the anomaly detector 204 determines that the difference between the anomaly-suspicion value and the infection-status value exceeds a predefined threshold value (e.g., 0.3). A new training instance for the classifier 214a including the observation vector for the device 212a and the infection-status value can be made. The infection-status value can serve as the target value for the anomaly-suspicion value. The new training instance can be used to train or tune the classifier 214a to predict the infection-status value upon receiving an instance that includes the observation vector.

In some examples, the anomaly detector 204 may be configured to calculate a sum of the infection-status values $$\left(\text{e.g., according to the expression} \sum_{n=1}^{N} z^*_n\right).$$

If the sum of the infection-status values exceeds a predefined threshold, an alert flag can be triggered at the gateway 202. Alternatively, a ratio of infected devices can be determined based on the infection-status values. For example, devices with infection-status values that exceed a predefined threshold can be considered infected. The number of infected devices connected to the network 200 can be divided by the total number of devices connected to the network to determine the ratio of infected devices. If the ratio of infected devices exceeds a threshold ratio, an alert flag can be triggered at the gateway 202.

Figure 3:
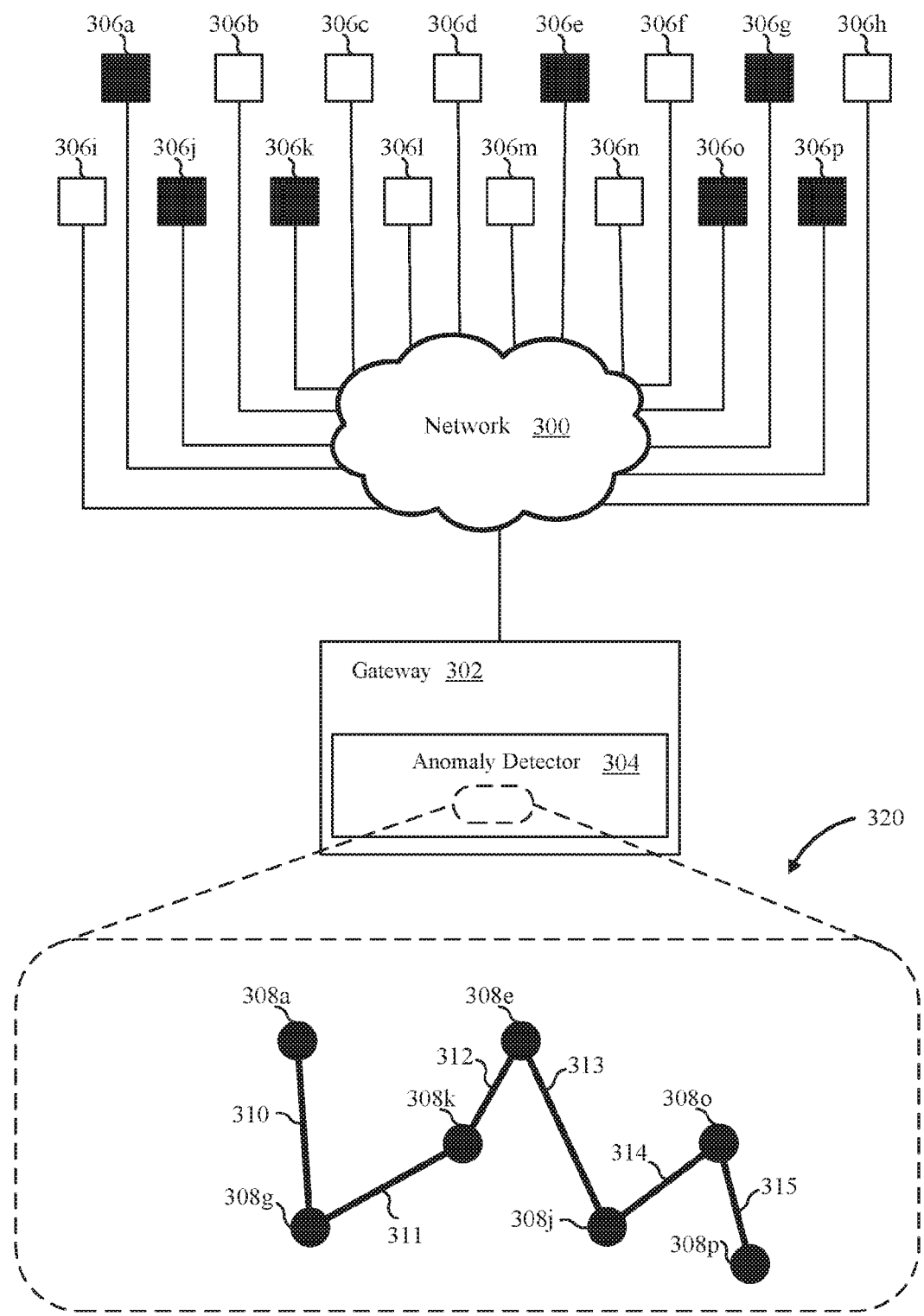
FIG. 3 is a block diagram illustrating an example of how an anomaly detector at a gateway can generate a graph based on network communications that occur between devices during a time period, according to one embodiment.

FIG. 3 is a block diagram illustrating an example of an anomaly detector 304 generating a graph 320 based on network communications, according to one embodiment. For this example, assume that the device 306a communicates with the device 306g during the time period. Also assume device 306g communicates with device 306k, device 306e communicates with device 306k, device 306e communicates with device 306j, device 306j communicates with device 306o, and device 306p communicates with device 306o. Also assume that the devices 308b-d, 306f, 306h-i, and 306l-n do not send or receive any network communications during the time period. The anomaly detector 302 generates vertex 308a to represent device 306a. Furthermore, the anomaly detector 302 generates vertex 308g to represent device 306g, vertex 308k to represent device 306k, vertex 308e to represent device 306e, vertex 308j to represent device 306j, vertex 308o to represent device 306o, and vertex 308p to represent device 306p.

In one embodiment, the anomaly detector 304 creates edge 310 to reflect that device 306a communicated with device 306g. Further, the anomaly detector 304 creates edge 311 to reflect that device 306g communicated with device 306k, edge 312 to reflect that device 306k communicated with device 306e, edge 313 to reflect that device 306e communicated with device 306j, edge 314 to reflect that device 306j communicated with device 306o, and edge 315 to reflect that device 306o communicated with device 306p. Network communications may be sent via the network 300. The anomaly detector receives observation vectors from each device 306a, 306g, 306k, 306e, 306j, 306o, and 306p.

The anomaly detector 304 then uses the graph 320 to determine an order (i.e., permutation) for the vertices 308a-p for a conditional probability function of infection-status labels given the observation vectors. In one example, since the first network communication in the time period was exchanged between device 306a and device 306g, and since vertex 308a is only associated with a single edge (edge 310), vertex 308a can be designated as the first in the order. Vertex 308g can be designated as second, 308k as third, 308e as fourth, 308j as fifth, 308o as sixth, and 308p as seventh. Based on this order, the conditional probability function can be used to determine infection-status values for the devices 306a, 306g, 306k, 306e, 306j, 306o, and 306p for the time period to which the graph 320 applies. Since the anomaly detector 304 determines the order of the vertices for the conditional probability function based on the graph 320, the graph 320 ultimately helps determine which set of infection-status values the anomaly detector 304 will predict for the devices 306a, 306g, 306k, 306e, 306j, 306o, and 306p.

In other examples, the graph may not be a linear chain. For example, when a feature function is being evaluated for an nth vertex of a graph that does not form a linear chain, the feature function can operate on the entire neighborhood of the nth vertex rather than on a single vertex. The neighborhood of the nth vertex may be defined as a clique (e.g., a maximal clique) wherein each vertex of the clique is connected by an edge to every other vertex in the clique. If a graph has disjoint components, the disjoint components can be evaluated separately as though they were separate graphs.

Figure 4A:
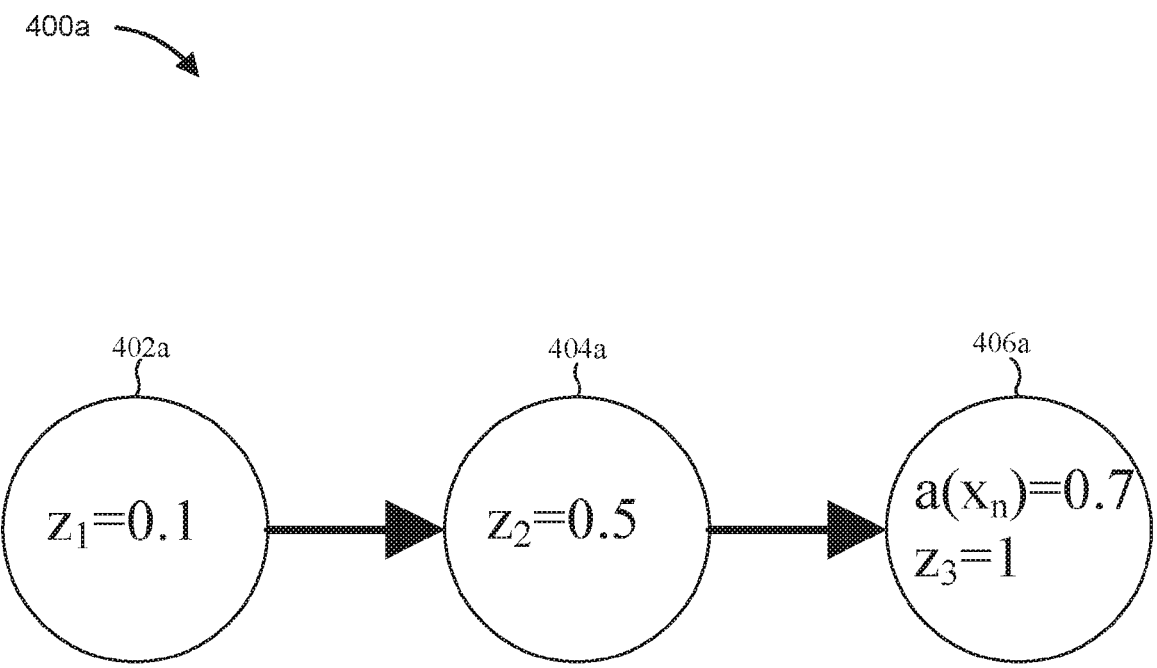
FIG. 4A is a block diagram illustrating a graph segment that may be used to provide inputs to a first example feature function, according to one embodiment.

FIG. 4A is a block diagram illustrating a graph segment 400a that may be used to provide inputs to an example feature function, according to one embodiment. In conjunction with a CRF model, the graph segment 400a may be traversed in order from the vertex 402a to the vertex 404a to the vertex 406a. Each of the vertices 402a, 404a, and 406a may represent a respective device in a network. The graph segment 400a may be part of a graph for a time window.

An example $i^{th}$ feature function $f_i$ may be defined piecewise as:

$$f_i(z_{n-1}, z_n, x_{1:N}, n) = \{1, \quad (z_{n-1} \geq 0.5) \cap (z_n = 1) \cap [a(x_n) > 0.5]$$

$$\{0, \quad (z_{n-1} < 0.5) \cap (z_n \neq 1) \cup [a(x_n) \leq 0.5]$$

where i is an integer index of the feature function $f_i$, $z_n$ is the infection-status label associated with an $n^{th}$ vertex, $z_{n-1}$ is the infection-status label associated with an $(n-1)^{th}$ vertex that precedes the $n^{th}$ vertex in an order and is connected to the $n^{th}$ vertex by an edge, N represents the number of vertices in the graph, $x_{1:N}$ represents the set of observation vectors from devices that are represented by vertices in the graph, $a(x_n)$ is an anomaly-suspicion value calculated by a classifier that is associated with an $n^{th}$ device represented by the $n^{th}$ vertex using the observation vector $x_n$, and the observation vector $x_n$ includes observations of the $n^{th}$ device. In this example, assume that an infection-status label of 1 indicates a high likelihood of infection, an infection-status label closer to zero indicates a low likelihood of infection, and an infection-status label of 0.5 indicates a medium likelihood of infection (e.g., that the labeled device has engaged in some suspicious network activity).

To evaluate this example feature function $f_i$ for the graph segment 400a, suppose that the vertex 406a is the $n^{th}$ vertex and that vertex 404a is the $(n-1)^{th}$ vertex. Also suppose that the infection-status label $z_{n-1}$ (which is $z_2$ in this example) is 0.5 and the infection-status label $z_n$ (which is $z_3$ in this example) is 1. Furthermore, suppose that the anomaly-suspicion value $a(x_n)$ is 0.7. Since $z_{n-1}$ is greater than or equal to 0.5, $z_n$ equals 1, and $a(x_n)$ is greater than 0.5, the feature function $f_i$ evaluates to an output of 1 in this example.

Considering this example in the context of equations 1 and 2, this example feature function has the effect of making it more probable that an infection-status value of the $n^{th}$ vertex will be 1 if the infection-status value of the $(n-1)^{th}$ vertex is at least 0.5. This is because, according to equation 1, the conditional probability of a set of infection-status labels increases when the weighted sum over the F feature functions increases. If the example feature function evaluates to 1, the weighted sum over the F feature functions will be greater than it would be if the example feature function evaluated to zero (unless the example feature function has a weight of zero).

Figure 4B:
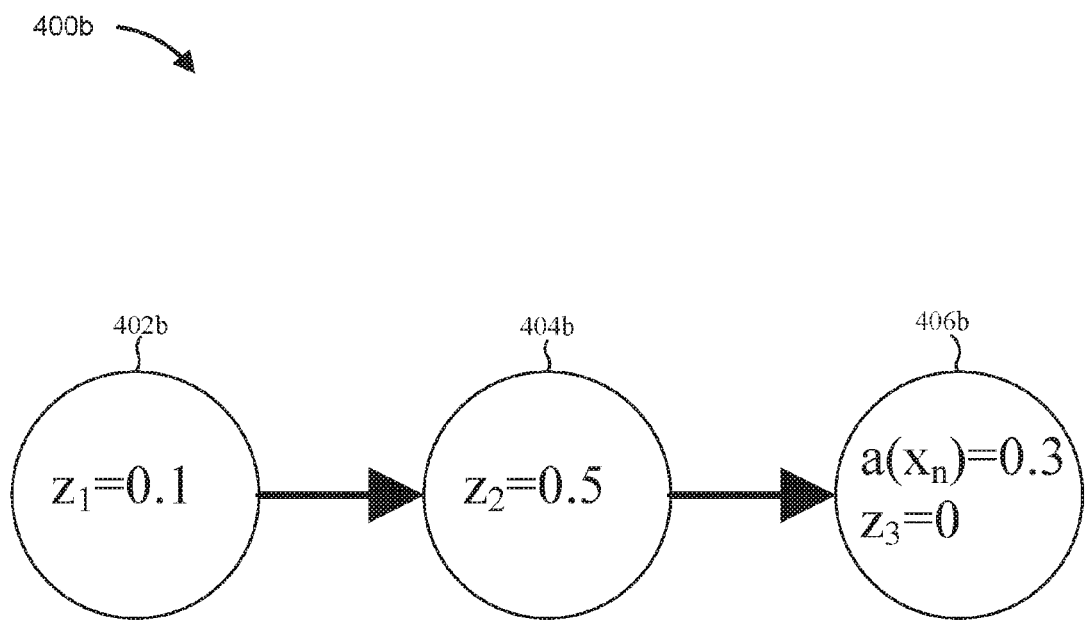
FIG. 4B is a block diagram illustrating a graph segment that may be used to provide inputs to a second example feature function, according to one embodiment.

FIG. 4B is a block diagram illustrating a graph segment 400b that may be used to provide inputs to an example feature function, according to one embodiment. In conjunction with a CRF model, the graph segment 400b may be traversed in order from the vertex 402b to the vertex 404b to the vertex 406b. Each of the vertices 402b, 404b, and 406b may represent a respective device in a network. The graph segment 400b may be part of a graph for a time window.

A second example $i^{th}$ feature function $f_i$ may be defined piecewise as:

$$f_i(z_{n-1}, z_n, x_{1:N}, n) = \{1, \quad (z_{n-1} \geq 0.5) \cap (z_n = 1) \cap [a(x_n) > 0.4]$$

$$\{0, \quad (z_{n-1} < 0.5) \cap (z_n \neq 1) \cup [a(x_n) \leq 0.4]$$

where i is an integer index of the feature function $f_i$, is the infection-status label for the device, $z_n$ is the infection-status label associated with an $n^{th}$ vertex, $z_{n-1}$ is the infection-status label associated with an $(n-1)^{th}$ vertex that precedes the $n^{th}$ vertex in an order and is connected to the $n^{th}$ vertex by an edge, N represents the number of vertices in the graph, $x_{1:N}$ represents the set of observation vectors from devices that are represented by vertices in the graph, $a(x_n)$ is an anomaly-suspicion value calculated by a classifier that is associated with an $n^{th}$ device represented by the $n^{th}$ vertex using the observation vector $x_n$, and the observation vector $x_n$ includes observations of the $n^{th}$ device. Again, in this example, assume that an infection-status label of 1 indicates a high likelihood of infection, an infection-status label closer to zero indicates a low likelihood of infection, and an infection-status label of 0.5 indicates a medium likelihood of infection (e.g., that the labeled device has engaged in some suspicious network activity).

To evaluate this second example feature function $f_i$ for the graph segment 400b, suppose that the vertex 406b is the $n^{th}$ vertex and that vertex 404b is the $(n-1)^{th}$ vertex. Also suppose that the infection-status label $z_{n-1}$ (which is $z_2$ in this example) is 0.5 and the infection-status label $z_n$ (which is $z_3$ in this example) is 0. Furthermore, suppose that the anomaly-suspicion value $a(x_n)$ is 0.3. Since $z_{n-1}$ is less than or equal to 0.5, $z_n$ equals 0, and $a(x_n)$ is less than 0.4, the second feature function $f_i$ evaluates to an output of 1 in this example.

Considering this example in the context of equations 1 and 2, this second example feature function has the effect of making it more probable that an infection-status value of the $n^{th}$ vertex will be 0 if the infection-status value of the $(n-1)^{th}$ vertex is less than or equal to 0.5 and the anomaly-suspicion value of the $n^{th}$ vertex is less than 0.4. Again, this is because the conditional probability of a set of infection-status labels (as shown in equation 1) increases when the weighted sum over the F feature functions increases. If the second example feature function evaluates to 1, the weighted sum over the F feature functions will be greater than it would be if the second example feature function evaluated to zero (unless the second example feature function has a weight of zero).

While FIGS. 4A and 4B are used to show two possible examples of feature functions, many other types of feature functions are possible. Feature functions may be provided by domain experts or derived using machine-learning techniques applied to training data, for example. As explained herein, weights for feature functions can be learned. Thus, feature functions whose weights are large after training may be considered more valuable that feature functions whose weights are close to zero after training.

Figure 5:
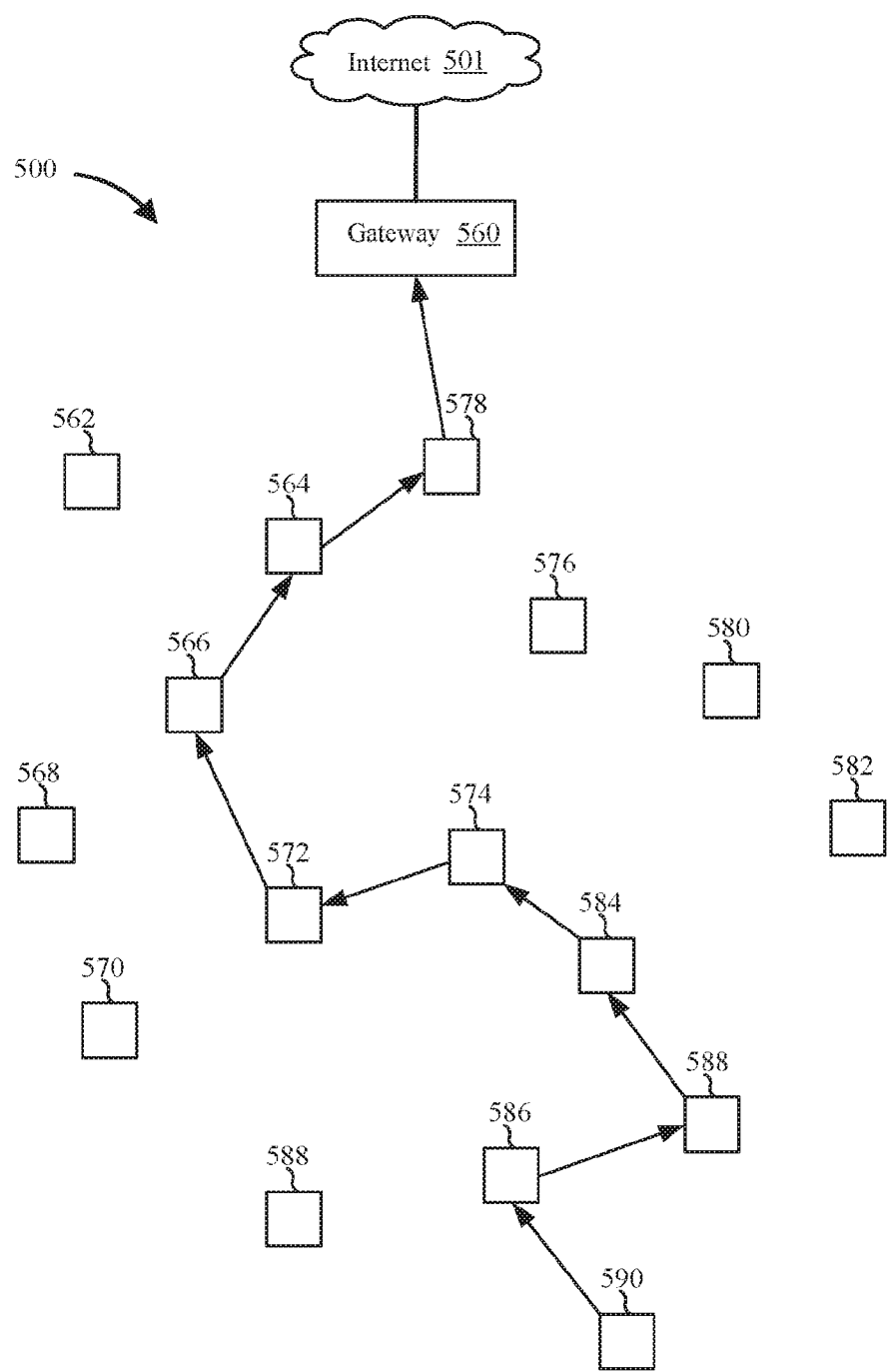
FIG. 5 illustrates an example of a multi-hop wireless sensor network (WSN) that is connected to the Internet via a gateway, according to one embodiment.
Figure 6:
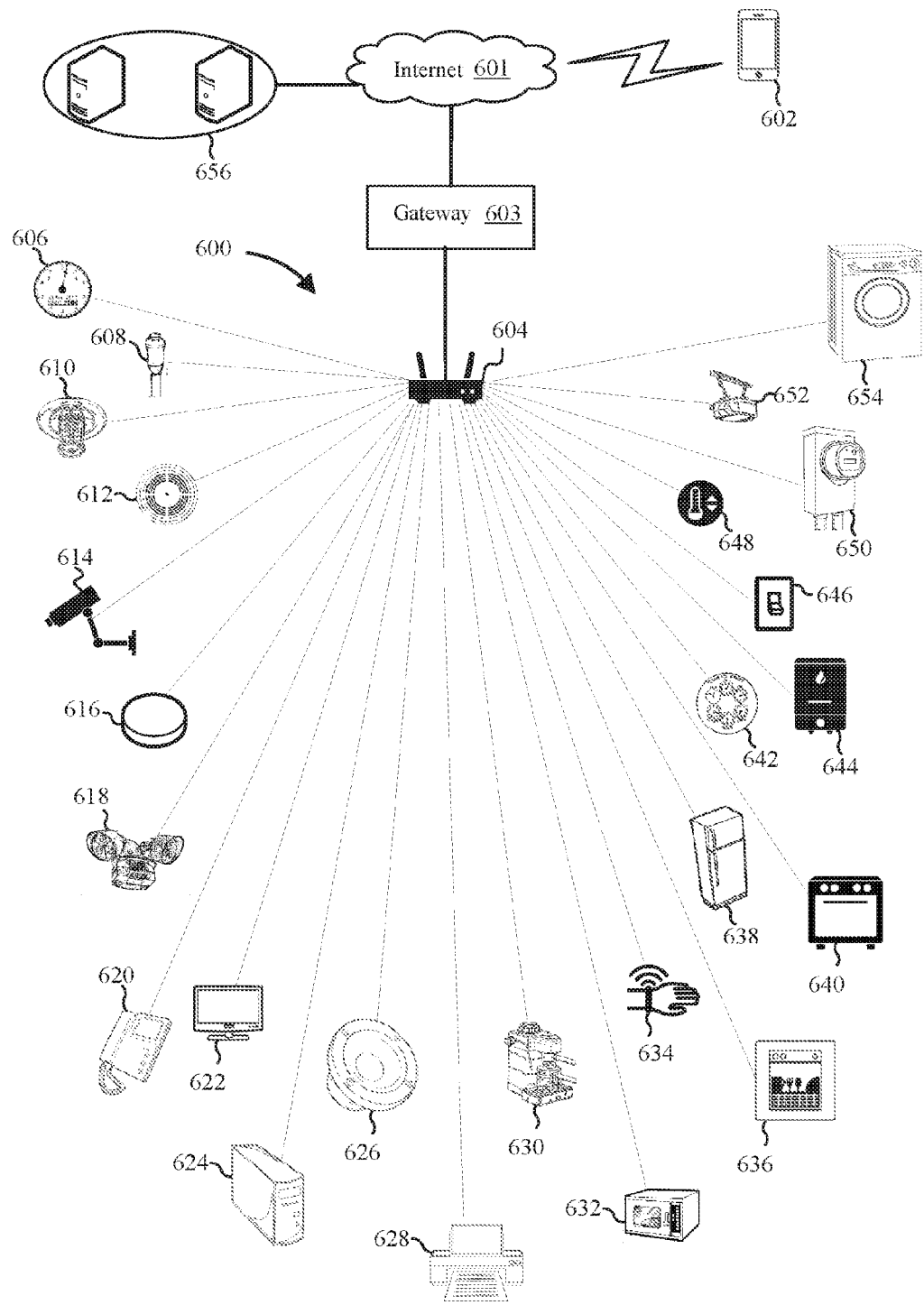
FIG. 6 illustrates one example of a local area network (LAN) that is connected to the Internet via a router and a gateway, according to one embodiment.

Since technologies of the present closure may be very useful for networks that include IoT devices, FIGS. 5 and 6 are included to provide some specific examples of how and why IoT devices may communicate with each other and with other devices over a network. However, the examples of FIGS. 5 and 6 are not intended to limit the scope of the claimed subject matter.

FIG. 5 illustrates an example of a multi-hop wireless sensor network (WSN) 500 that is connected to the Internet 501 via a gateway 560, according to one embodiment. The multi-hop WSN 500 can include wireless sensor nodes 562-590. Each of the wireless sensor nodes 562-590 may be equipped with a radio transceiver, an antenna, a microcontroller (MCU) with a processor and memory, a sensor, and an energy source (e.g., a battery). The wireless sensor nodes 562-590 may be distributed over a relatively large geographical area and may periodically take sensor readings (e.g., of temperature, pressure, humidity, or some other quantity).

In order to reduce energy consumption, each wireless sensor node 562-590 may be configured to send wireless transmissions with relatively low power. As a result, a wireless transmission from one of the wireless sensor nodes 562-590 may travel a relatively short distance. The wireless sensor nodes 562-590 can therefore be configured to relay a network communications from one node to another until the network communication reaches the gateway 560.

For example, the wireless sensor node 590 may take a first sensor reading. The wireless sensor node 590 may then wirelessly send the first sensor reading in a first network communication to the wireless sensor node 586. The wireless sensor node 586 may then wirelessly send the first sensor reading in a second network communication to the wireless sensor node 588. Optionally, the wireless sensor node 586 may also include a second sensor reading (e.g., that was taken at the wireless sensor node 586) in the second network communication. This pattern may continue as a network communication with the first sensor reading may be sent in turn from wireless sensor node 588 to wireless sensor node 584, from wireless sensor node 584 to wireless sensor node 574, from wireless sensor node 574 to wireless sensor node 572, from wireless sensor node 572 to wireless sensor node 566, from wireless sensor node 566 to wireless sensor node 564, from wireless sensor node 564 to wireless sensor node 578, and finally from wireless sensor node 578 to the gateway 560. The network communication that arrives at the gateway 560 includes the first sensor reading that was made at the wireless sensor node 590 and may also include additional sensor readings from one or more of the other wireless nodes in the path.

FIG. 6 illustrates one example of a local area network (LAN) 600 that is connected to the Internet 601 via a router 604 and a gateway 603, according to one embodiment. (The router 604 and the gateway 603 may, in some examples, be housed or integrated in a single unit.) Multiple devices may be connected to the LAN 600 through wired (e.g., Ethernet) or wireless (e.g., WiFi or BlueTooth) connections to the router 604. For example, a water meter 606, an outdoor lawn-sprinkler system 608, and an indoor emergency-sprinkler system 610 may be connected to the LAN 600. In addition, a smoke detector 612, a security camera 614, a carbon monoxide detector 616, and a motion detector system 618 may also be connected to the LAN 600. An office telephone 620, a television 622, a desktop computer 624, an audio system 626 (e.g., a stereo system or an intercom system), and a printer 628 may also be connected to the LAN. A coffee maker 630, a microwave 632, a wearable device 634 (e.g., a wearable baby monitor or a fitness tracker), a dishwasher 636, a refrigerator 638, and an oven/stove 640 may also be connected to the LAN 600. A gas meter 642, a water heater 644, a lighting system 646, a thermostat 648, an electric meter 650, a garage-door opener 652, and a washer 654 may also be connected to the LAN 600. A mobile device 602 may be able to communicate with devices that are connected to the LAN 600 via a cellular connection to the Internet 601. Alternatively, if the mobile device 602 is connected to the LAN 600, the mobile device may communicate directly through the LAN 600 (e.g., by a WiFi connection to the router 604). Servers 656 may be connected to the Internet 601 and may include servers that belong to device manufacturers, utility companies, law enforcement agencies, emergency service providers, entertainment service providers, or other entities.

Devices connected to the LAN 600 may send a variety of digital communications to each other or to other destinations that are accessible via the Internet 601 for a variety of reasons. The following examples of such communications are provided for illustrative purposes, but are not intended to be limiting.

In one example, the water meter 606 may send a communication to a utility-company server of the servers 656 indicating an amount of water used by a household during a predefined time period (e.g., a month) to enable the utility company to generate a bill for the water used. The water meter 606 may also be configured to detect when the amount of water used by the household during a certain time period exceeds a predefined threshold. When the threshold has been exceeded, the water meter 606 may send a communication (e.g., an email) to the mobile device 602 to advise a user that the threshold has been exceeded. In addition, the water meter 606 may be configured to send a communication to the outdoor lawn-sprinkler system 608 indicating that the household's lawn is to be watered at slower rate (or not at all). The water meter 606 may also send a communication to the dishwasher 636 indicating that the dishwasher 636 is to use a more water-efficient dish-cleaning mode until further notice. The water meter 606 may also send a communication to the refrigerator 638 indicating that ice making is to be reduced or ceased until further notice. In addition, the water meter 606 may send a communication to the washer 654 indicating that the washer 654 is to forgo performing extra rinse cycles until further notice.

In another example, the electric meter 650 may send a communication to a utility-company server of the servers 656 indicating an amount of power used by a household during a predefined time period (e.g., a month) to enable the utility company to generate a bill for the power used. The electric meter 650 may also be configured to detect when the amount of power used by the household during a certain time period exceeds a predefined threshold. When the threshold is exceeded, the electric meter 650 may send a communication to the thermostat 648 indicating that the household temperature should be set several degrees higher in order to reduce electricity use by an air conditioner or swamp cooler. The electric meter 650 may also send a communication to the lighting system 646 indicating that one or more lights are to be turned off in the household until further notice (e.g., from the motion detector system 618). The electric meter 650 may also send a communication to the refrigerator 638 indicating that an internal temperature of the refrigerator 638 should be set several degrees higher in order to reduce power consumption. The electric meter 650 may also send communications to other devices, such as the washer 654, the desktop computer 624, the microwave 632, and the dishwasher 636, indicating that energy-efficient modes of operation for each respective device are to be used until further notice or for a specific period of time.

In another example, the gas meter 642 may send a communication to a utility-company server of the servers 656 indicating an amount of gas used during a predefined time period (e.g., a month) to enable the utility company to generate a bill for the gas used. The gas meter 642 may also detect that the amount of gas used by the household during a certain period of time exceeds a predefined threshold. As a response, the gas meter 642 may send a communication to the water heater 644 indicating that water in the water heater 644 should be heated to a lower temperature in order to reduce gas consumption. In addition, the gas meter 642 may send a communication the thermostat 648 indicating that the household temperature should be set several degrees lower in order to reduce gas consumption by a gas furnace or heater.

In another example, the smoke detector 612 may detect that there is smoke in a household. As a response, the smoke detector 612 may send a communication to the indoor emergency-sprinkler system 610 indicating that the emergency-sprinkler system 610 is to begin spraying water immediately or after a certain period of time. If the smoke detector 612 detects that there is no longer smoke in the household before that period of time elapses, the smoke detector 612 may send a follow-up communication to the emergency-sprinkler system 610 indicating that the scheduled water spraying should be aborted. The smoke detector 612 may also send a communication to the gas meter 642, the oven/stove 640, and/or the water heater 644 indicating that gas use should be cut off so that gas will not fuel a fire or cause an explosion. The smoke detector may also send a communication to the mobile device 602 indicating that smoke has been detected. The smoke detector 612 may also query the motion detector system 618 to determine if any motion has recently been detected in the household. If the motion detector system 618 responds affirmatively, the smoke detector 612 may signal the audio system 626 to broadcast an alarm and/or signal the office phone 620 to dial an emergency telephone number.

In another example, the carbon monoxide detector 616 may detect that the level of carbon monoxide in a home has exceeded a predefined level. In response, the carbon monoxide detector 616 may send a communication to the garage-door opener 652 to open a garage door in order to ventilate a garage of the household. In addition, the carbon monoxide detector 616 may send a communication to the water heater 644 to stop a pilot flame that may be producing carbon monoxide. The carbon monoxide detector 616 may also send a communication to the mobile device 602 indicating that the level of carbon monoxide in the household is dangerously high. The carbon monoxide detector 616 may also send a communication to the gas meter 642, the thermostat 648, and/or the oven/stove 640 indicating that gas use should be cut off so that gas will not be burned in the household (since burning may be producing the carbon monoxide). The carbon monoxide detector 616 may also query the wearable device 634 to inquire whether any metrics measured by the wearable device (e.g., a wearer's heart rate or blood oxygenation levels) suggest that the wearer is imminently suffering from carbon monoxide poisoning. If the wearable device 634 responds affirmatively, the carbon monoxide detector 616 may signal the audio system 626 to broadcast an alarm and/or signal the office phone 620 to dial an emergency telephone number.

In another example, the television 622 may receive a video stream from a video-content server of the servers 656. The television 622 may also send a communication to the audio system 626 requesting that the audio system 626 play an audio signal associated with the video stream. The television 622 may also send a communication to the audio system 626 requesting that the audio signal be played at a specified volume or with specific levels of bass and/or treble enhancement. In addition, the television 622 may send a communication to a data-mining server of the servers 656 to report use statistics associated with the television 622 or with services accessed through the television 622 (e.g., videos watched, times of day when the television 622 is used most frequently, etc.).

In another example, the motion detector system 618 may send a communication to the security camera 614 indicating that motion has been detected. The security camera 614 may begin recording a video feed and may send the video feed to the desktop computer 624, the mobile device 602, the television 622, or a security-service server of the servers 656. In addition, the motion detector system 618 or the security camera 614 may send a communication to the lighting system 646 indicating that one or more household lights should be turned on.

In another example, the mobile device 602 may send a communication to the coffee maker 630 indicating that the coffee maker 630 should commence brewing a cup of coffee. In response, the coffee maker can send a communication to the mobile device 602 indicating when a cup of coffee is ready for consumption. Similarly, the mobile device 602 may send a communication to the oven/stove 640 indicating that the oven/stove 640 should begin preheating. The oven/stove 640 can respond by sending one or more communications indicating a current temperature of the oven/stove 640 to the mobile device 602.

In another example, the wearable device 634 may measure metrics associated with a wearer's health and/or movement and send periodic communications to the mobile device 602, a server of the servers 656, and/or the desktop computer 624. The wearable device 634 may also send an alarm communication to the mobile device 602, to the office telephone 620, or to a server of the servers 656 if measured metrics indicate a latent or imminent threat to the wearer's health.

In another example, the desktop computer 624 may send performance metrics, error logs, and other information to a manufacturer server of the servers 656 and may also receive software updates from the manufacturer server. Similarly, other devices that are connected to the LAN 600, such as the printer 628, the office telephone 620, or the wearable device 634 may send use statistics, error logs, and other communications to the servers 656 and may also receive software updates from the servers 656.

The preceding examples provide some examples of Internet-of-Things (IoT) devices and communications. However, systems and methods of the present disclosure are also pertinent to many other types of devices and communications. Devices such as door sensors for security systems, digital video disk (DVD) players, gaming consoles, electronic safes, global positioning systems (GPSs), location trackers, activity trackers, laptop computers, tablet computers, automated door locks, air conditioners, furnaces, heaters, dryers, wireless sensors in wireless sensor networks, large or small appliances, personal alert devices (e.g., used by elderly persons who have fallen in their homes), pacemakers, bar-code readers, implanted devices, ankle bracelets (e.g., for individuals under house arrest), prosthetic devices, telemeters, traffic lights, user equipments (UEs), or any apparatuses including digital circuitry that is able to achieve network connectivity may be considered IoT devices or networking devices for the purposes of this disclosure. Furthermore, emails, simple message service (SMS) messages, transmission control protocol (TCP) messages, or other digital messages sent over a network are all considered to be "network communications" for the purposes of this disclosure.

Figure 7:
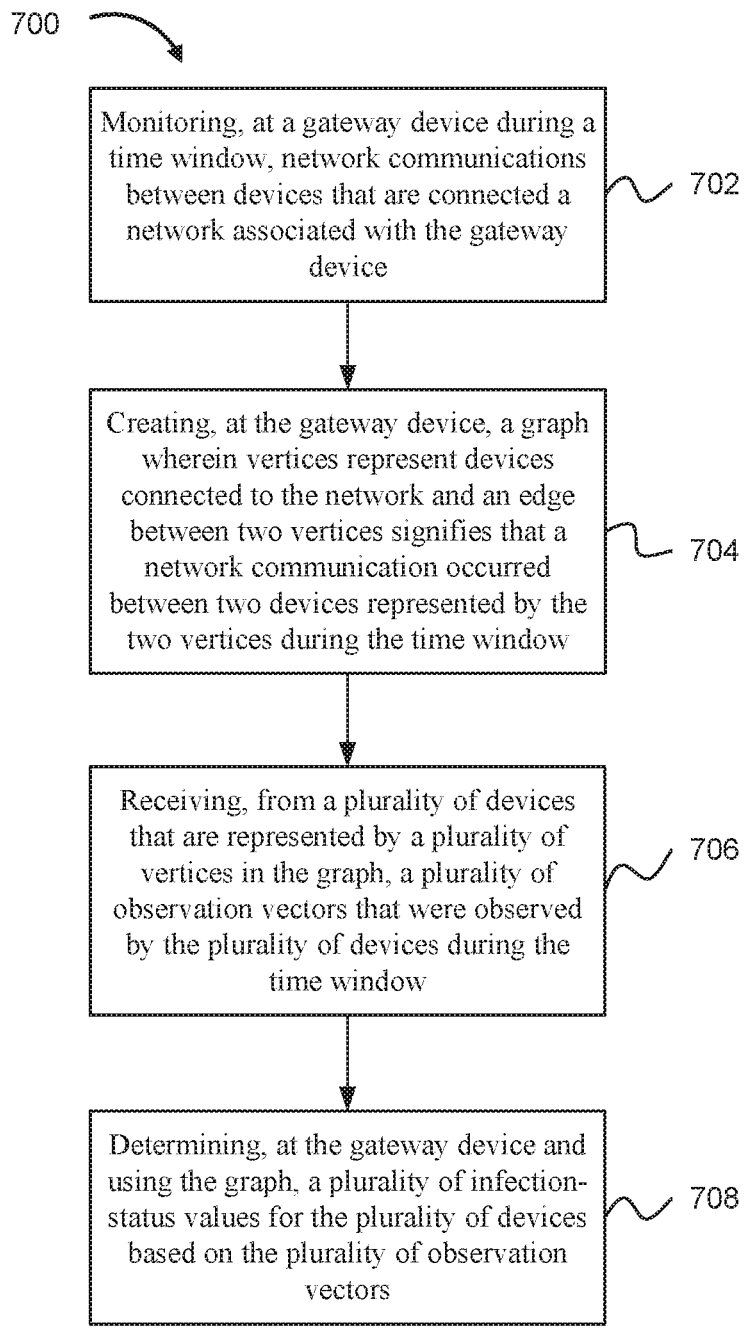
FIG. 7 is a flow diagram illustrating a process for an anomaly detector, according to one embodiment.

FIG. 7 is a flow diagram illustrating a process 700 for an anomaly detector, according to one embodiment. The process 700 that can be implemented as a method or can be executed as instructions on a machine (e.g., by one or more processors), where the instructions are included on at least one computer-readable storage medium (e.g., a transitory or non-transitory computer-readable storage medium).

At block 702, the anomaly detector monitors, at a gateway device during a time window, network communications between devices that are connected a network associated with the gateway device.

At block 704, the anomaly detector creates, at the gateway device, a graph wherein vertices represent devices connected to the network and an edge between two vertices signifies that a network communication occurred between two devices represented by the two vertices during the time window.

In addition, the anomaly detector can use a conditional random field (CRF) model to create a conditional probability function of infection-status values. The anomaly detector may define the conditional probability function using a plurality of feature functions that are associated with a plurality of weights.

Furthermore, the anomaly detector can receive training observation vectors and corresponding infection-status labels for the training observation vectors. A training observation vector and corresponding infection-status label can make up a training instance.

At block 706, the anomaly detector receives, from a plurality of devices that are represented by a plurality of vertices in the graph, a plurality of observation vectors that were observed by the plurality of devices during the time window. The anomaly detector can determine the plurality of weights by training the CRF model using the observation vectors and the infection-status labels.

In addition, the anomaly detector may also determine a plurality of anomaly-suspicion values for the plurality of devices using a plurality of classifiers. Each anomaly-suspicion value can be associated with a respective device and can be determined by a respective classifier that uses an observation vector observed at the respective device as input.

At block 708, the anomaly detector determines, at the gateway device and using the graph, a plurality of infection-status values for the plurality of devices based on the plurality of observation vectors.

In examples where a conditional probability function is defined, the anomaly detector can determine the plurality of infection-status values by identifying one or more maxima of the conditional probability function given the plurality of observation vectors. In addition, in examples where the anomaly detector determines anomaly-suspicion values, one or more feature functions of the plurality of feature functions can use an anomaly-suspicion value associated with an $n^{th}$ device as an input to determine an output value associated with the $n^{th}$ device, wherein n is an integer index.

Furthermore, in examples where the anomaly detector determines anomaly-suspicion values, the anomaly detector can also determine that a difference between an infection-status value for a device and an anomaly-suspicion value for the device exceeds a predefined threshold and use the infection-status value to update a classifier associated with the device.

In some examples, that anomaly detector may also calculate a sum of the infection-status values for the plurality of devices. If the sum of the infection-status values exceeds a predefined threshold value, the anomaly detector can set or trigger an alert flag at the gateway device based on the determination.

Figure 8:
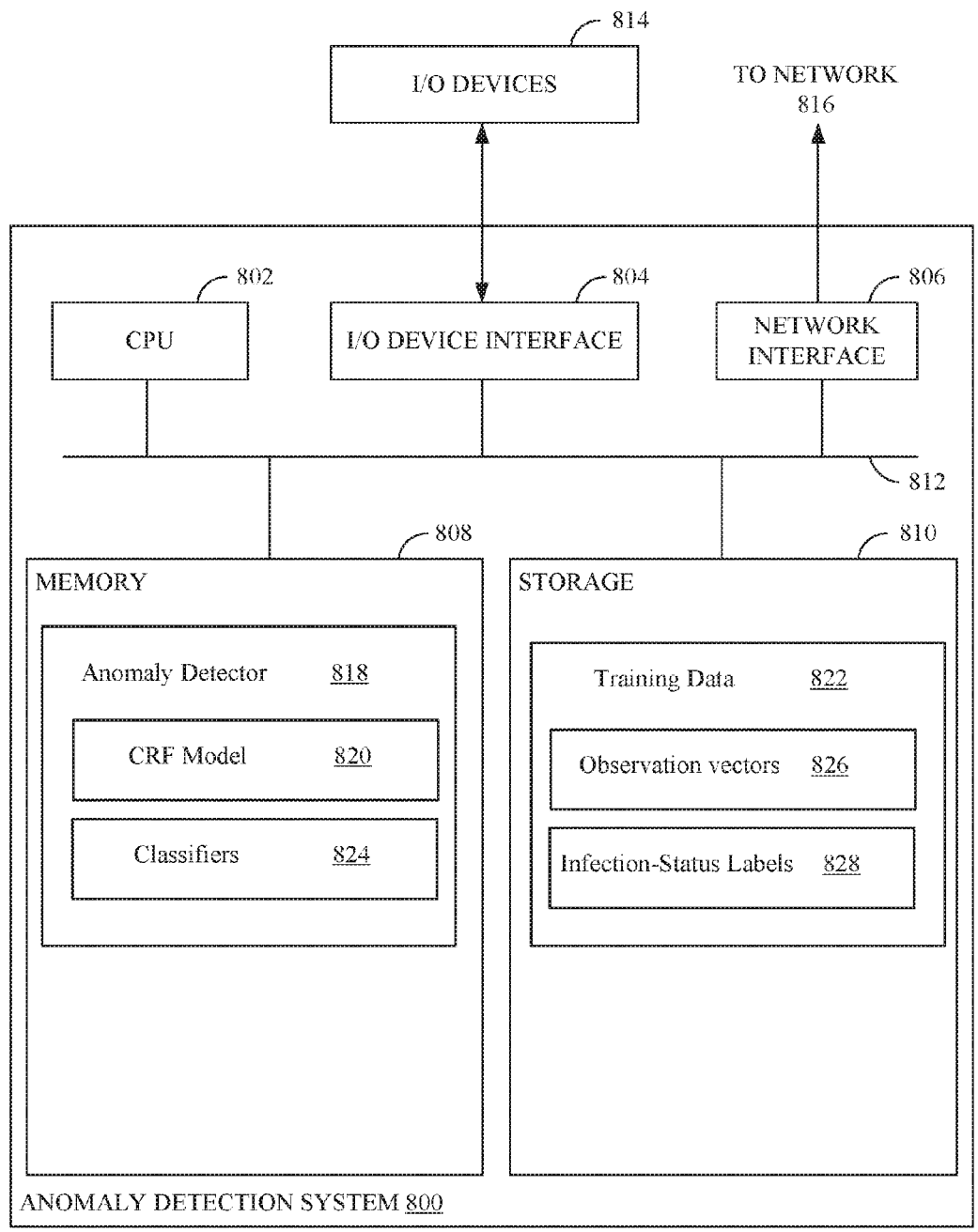
FIG. 8 illustrates an example anomaly detection system that determines infection-status values for devices connected to a network, according to an embodiment.

FIG. 8 illustrates an example anomaly detection system 800 that determines infection-status values for devices connected to a network, according to an embodiment. As shown, the anomaly detection system 800 includes, without limitation, a central processing unit (CPU) 802, one or more I/O device interfaces 804 which may allow for the connection of various I/O devices 814 (e.g., keyboards, displays, mouse devices, pen input, etc.) to the image processing system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 can represent a single CPU, multiple CPUs, a single CPU having multiple processing cores, and the like. Additionally, the memory 806 represents random access memory. Furthermore, the storage 810 may be a disk drive. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes an anomaly detector 818 that includes a CRF model 820 and classifiers 824. As shown, storage 810 includes training data 822 that includes observation vectors 826 and infection-status labels 828. Both the CRF model 820 and the classifiers 824 can be trained using the training data.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
monitoring, at a gateway device, network communications between a plurality of computing devices connected to a network associated with the gateway device;
creating, at the gateway device, a graph, wherein each vertex of the graph represents one of the computing devices connected to the network and each edge of the graph represents network communication that has occurred between the computing devices connected by that edge during a time window;
receiving, from each of the computing devices, a collection of one or more performance metrics observed by that computing device during the time window;
determining, based on the graph and the collections of one or more performance metrics, a respective measure of risk for each of the computing devices for the time window;
determining, from the graph, a clique of computing devices that are linked by edges in the graph;
adjusting the respective measure of risk for the time window for one of the computing devices in the clique based on the measures of risk for the remaining computing devices in the clique; and
in response to determining that a given computing device in the clique is infected with malware based on the respective measure of risk exceeding a threshold, setting an alert flag at the gateway device indicating that the given computing device is infected.

2. The method of claim 1, further comprising:
creating a conditional probability function of measures of risk based on a conditional random field (CRF) model, wherein the conditional probability function is defined using a plurality of feature functions that are associated with a plurality of weights; and
determining, at the gateway device, the respective measures of risk based on the conditional probability function, the graph, and the collections of one or more performance metrics received from each of the computing devices.

3. The method of claim 2, further comprising:
determining an anomaly-suspicion value for at least a first computing device using a first classifier, wherein the first classifier uses a collection of one or more performance metrics observed by the first computing device as input.

4. The method of claim 3, wherein at least one feature function of the plurality of feature functions uses the anomaly-suspicion value as an input to determine an output value associated the first computing device.

5. The method of claim 3, further comprising:
determining a difference between the respective measure of risk for the first computing device and the anomaly-suspicion value for the first computing device exceeds a predefined threshold; and
tuning the first classifier to predict the respective measure of risk for the first device when given an observation vector.

6. The method of claim 2, further comprising:
receiving training data for the CRF model; and
determining the plurality of weights by training the CRF model using the training data.

7. The method of claim 1, further comprising:
calculating a sum of the respective measures of risk for the computing devices;
determining that the sum of the respective measures of risk exceeds a predefined threshold value; and
triggering an alert based on the determination.

8. A system comprising:
one or more processors; and
a memory storing one or more applications that, when executed on the one or more processors, perform an operation, the operation comprising:
monitoring, at a gateway device, network communications between a plurality of computing devices connected to a network associated with the gateway device,
creating, at the gateway device, a graph, wherein each vertex of the graph represents one of the computing devices connected to the network and each edge of the graph represents network communication that has occurred during a time window between the computing devices connected by that edge,
receiving, from each of the computing devices, a collection of one or more performance metrics observed by that computing device during the time window,
determining, based on the graph and the collections of one or more performance metrics, a respective measure of risk for each of the computing devices for the time window;
determining, from the graph, a clique of computing devices that are linked by edges in the graph;
adjusting the respective measure of risk for the time window for one of the computing devices in the clique based on the measures of risk for remaining computing devices in the clique; and
in response to determining that a given computing device in the clique is infected with malware based on the respective measure of risk exceeding a threshold, setting an alert flag at the gateway device that the given computing device is infected.

9. The system of claim 8, wherein the operation further comprises:
creating a conditional probability function of measures of risk based on a conditional random field (CRF) model, wherein the conditional probability function is defined using a plurality of feature functions that are associated with a plurality of weights; and
determining, at the gateway device, the respective measures of risk based on the conditional probability function, the graph, and the collections of one or more performance metrics received from each of the computing devices.

10. The system of claim 9, wherein the operation further comprises:
determining an anomaly-suspicion value for at least a first computing device using a first classifier, wherein the first classifier uses a collection of one or more performance metrics observed by the first computing device as input.

11. The system of claim 10, wherein at least one feature function of the plurality of feature functions uses the anomaly-suspicion value as an input to determine an output value associated the first computing device.

12. The system of claim 10, wherein the operation further comprises:
determining a difference between the respective measure of risk for the first computing device and the anomaly-suspicion value for the first computing device exceeds a predefined threshold; and
tuning the first classifier to predict the respective measure of risk for the first device when given an observation vector.

13. The system of claim 9, wherein the operation further comprises:
receiving training data for the CRF model; and
determining the plurality of weights by training the CRF model using the training data.

14. The system of claim 8, wherein the operation further comprises:
calculating a sum of the respective measures of risk for the computing devices;
determining that the sum of the respective measures of risk exceeds a predefined threshold value; and
triggering an alert based on the determination.

15. One or more non-transitory computer readable storage media encoded with software comprising computer executable instructions and when the software is executed is operable to:
monitor, at a gateway device, network communications between a plurality of computing devices connected to a network associated with the gateway device;
create, at the gateway device, a graph, wherein each vertex of the graph represents one of the computing devices connected to the network and each edge of the graph represents network communication that has occurred during a time window between the computing devices connected by that edge;
receive, from each of the computing devices, a collection of one or more performance metrics observed by that computing device during the time window;
determine, based on the graph and the collections of one or more performance metrics, a respective measure of risk for each of the computing devices for the time window;
determine, from the graph, a clique of computing devices that are linked by edges in the graph;
adjust the respective measure of risk for the time window for one computing device in the clique based on measures of risk for remaining computing devices in the clique; and
in response to determining that a given computing device of the clique is infected with malware based on the respective measure of risk exceeding a threshold, set an alert flag at the gateway device that the given computing device is infected.

16. The one or more non-transitory computer readable storage media of claim 15, wherein the software, when executed, is further operable to:
create a conditional probability function of measures of risk based on a conditional random field (CRF) model, wherein the conditional probability function is defined using a plurality of feature functions that are associated with a plurality of weights; and
determine, at the gateway device, the respective measures of risk based on the conditional probability function, the graph, and the collections of one or more performance metrics received from each of the computing devices.

17. The one or more non-transitory computer readable storage media of claim 16, wherein the software, when executed, is further operable to:
determine an anomaly-suspicion value for at least a first computing device using a first classifier, wherein the first classifier uses a collection of one or more performance metrics observed by the first computing device as input.

18. The one or more non-transitory computer readable storage media of claim 17, wherein at least one feature function of the plurality of feature functions uses the anomaly-suspicion value as an input to determine an output value associated the first computing device.

19. The one or more non-transitory computer readable storage media of claim 17, wherein the software, when executed, is further operable to:
determine a difference between the respective measure of risk for the first computing device and the anomaly-suspicion value for the first computing device exceeds a predefined threshold; and
tune the first classifier to predict the respective measure of risk for the first device when given an observation vector.

20. The one or more non-transitory computer readable storage media of claim 16, wherein the software, when executed, is further operable to:
receive training data for the CRF model; and
determine the plurality of weights by training the CRF model using the training data.

21. The one or more non-transitory computer readable storage media of claim 15, wherein the software, when executed, is further operable to:
calculate a sum of the respective measures of risk for the computing devices;
determine that the sum of the respective measures of risk exceeds a predefined threshold value; and
trigger an alert based on the determination.

* * * * *

UNITED STATES PATENT AND TRADEMARK OFFICE
CERTIFICATE OF CORRECTION

PATENT NO. : 10,193,913 B2
APPLICATION NO. : 15/228980
DATED : January 29, 2019
INVENTOR(S) : Lukas Machlica et al.

Page 1 of 1

It is certified that error appears in the above-identified patent and that said Letters Patent is hereby corrected as shown below:

On the Title Page

In item (57), in Column 2, in "Abstract", Lines 3-4, delete "are be" and insert -- are --, therefor.

In the Specification

In Column 6, Lines 60-65, delete

" $F(z_{1:N} | x_{1:N}) = (1/Z)\exp\left(\sum_{n=1}^{N}\sum_{i=1}^{F} w_i f_i(z_{n-1}, z_n, x_{1:N}, n)\right)$ (1) " and insert -- $p(z_{1:N} | x_{1:N}) = (1/Z) \exp\{\sum_{n=1}^{N} \sum_{i=1}^{F} w_i f_i(z_{n-1}, z_n, x_{1:N}, n)\}$ (1) --, therefor.

In Column 7, Line 5, delete "1," and insert -- 1, $z_n$ --, therefor.

In Column 7, Line 40, delete "$z^{(f)}_{1:N}$" and insert -- $z^{(t)}_{1:N}$ --, therefor.

In Column 7, Line 41, delete "$x^{(f)}_{1:N}$" and insert -- $x^{(t)}_{1:N}$ --, therefor.

In Column 9, Line 60, delete "$\{0, \quad (z_{n-1} < 0.5) \cap (z_n \neq 1) \cup [a(x_n) \leq 0.5]$," and insert -- $\{0, \quad (z_{n-1} < 0.5) \cup (z_n \neq 1) \cup [a(x_n) \leq 0.5]$ --, therefor.

In Column 10, Line 50, delete "$\{0, \quad (z_{n-1} < 0.5) \cap (z_n \neq 1) \cup [a(x_n) \leq 0.4]$," and insert -- $\{0, \quad (z_{n-1} < 0.5) \cup (z_n \neq 1) \cup [a(x_n) \leq 0.4]$ --, therefor.

Signed and Sealed this
Ninth Day of April, 2019

Andrei Iancu
*Director of the United States Patent and Trademark Office*